United States Patent
Latil (10) Patent No.: US 12,191,041 B2
(45) Date of Patent: Jan. 7, 2025

(54) SYSTEM FOR DETERMINING POWER GENERATED BY A NUCLEAR CORE ASSEMBLY

(71) Applicant: COMMISSARIAT A L'ENERGIE ATOMIQUE ET AUX ENERGIES ALTERNATIVES, Paris (FR)

(72) Inventor: Philippe Latil, Pertuis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 166 days.

(21) Appl. No.: 17/870,375

(22) Filed: Jul. 21, 2022

(65) Prior Publication Data

US 2023/0187091 A1 Jun. 15, 2023

(51) Int. Cl.
*G21C 17/032* (2006.01)
*G21C 17/112* (2006.01)
*G01F 1/10* (2006.01)

(52) U.S. Cl.
CPC .......... *G21C 17/032* (2013.01); *G21C 17/112* (2013.01); *G01F 1/103* (2013.01)

(58) Field of Classification Search
CPC ...... G21C 17/032; G21C 17/112; G01F 1/103
USPC ................................................. 376/246, 247
See application file for complete search history.

(56) References Cited

U.S. PATENT DOCUMENTS

| | | | |
|---|---|---|---|
| 4,255,235 A | 3/1981 | Dubourg | |
| 4,851,666 A | 7/1989 | Anderson et al. | |
| 4,885,943 A | 12/1989 | Tootell et al. | |
| 5,425,064 A * | 6/1995 | Termaat | G21C 17/032 376/246 |
| 2019/0376821 A1 | 12/2019 | Donzier et al. | |

FOREIGN PATENT DOCUMENTS

| | | |
|---|---|---|
| FR | 2 222 638 A1 | 10/1974 |
| FR | 2 413 757 A1 | 7/1979 |
| FR | 2 988 837 A1 | 10/2013 |
| GB | 752822 A | 7/1956 |
| JP | 57-168114 A | 10/1982 |
| JP | 2001-194378 A | 7/2001 |

(Continued)

OTHER PUBLICATIONS

French Preliminary Search Report issued Apr. 11, 2022 in French Application 21 07899 filed on Jul. 22, 2021, 9 pages (with English Translation of Categories of Documents & Written Opinion).

(Continued)

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A system for determining power generated by a nuclear core assembly immersed in heat transfer fluid. Light radiation reflected from the blades of a rotor located in the heat transfer fluid is used to determine the rotation speed of the rotor. The flow rate of the heat transfer fluid is determined based on the rotation speed. A difference in temperature between an inlet and an outlet of the assembly is calculated. Power generated by the assembly is determined based on the flow rate and the temperature difference.

18 Claims, 7 Drawing Sheets

(56) References Cited

FOREIGN PATENT DOCUMENTS

| WO | WO 2019/083701 A2 | 5/2019 |
| WO | WO 2019/083701 A3 | 5/2019 |

OTHER PUBLICATIONS

Gu et al., "Theory and structure of a modified optical fiber turbine flowmeter", Flow Measurement and Instrumentation, vol. 50, 2016, pp. 178-184.

* cited by examiner

SYSTEM FOR DETERMINING POWER GENERATED BY A NUCLEAR CORE ASSEMBLY

TECHNICAL FIELD

The present invention relates to the field of assemblies for nuclear reactors comprising a system for determining a power generated by an assembly. It has a particularly advantageous application in the field of determining a power generated by an assembly of a light water reactor.

STATE OF THE ART

In a nuclear power reactor, the core of the reactor receives combustible containing energy fissile materials. The nuclear combustible emits heat by fission reaction. The heat emitted is discharged by a heat-transfer fluid from the core to the conventional island of the nuclear power station, to transform it into electricity.

The core of the reactor is conventionally split into combustible assemblies, one loaded onto a side of the others in the tank of the reactor. An assembly is typically constituted of a bundle of combustible rods. Different assemblies can further be configured for specific actions, for purposes of control or safety, for example. During the operation of the reactor, these assemblies are passed through by the heat-transfer fluid, for example from bottom to top. The heat-transfer fluid is heat when they contact one another, and removes the thermal energy generated by fission.

The operation of a nuclear reactor is regulated in order to control the electrical power generated. For this, it is sought to determine the thermal power mainly supplied by the reactor, even more locally for each assembly. This determination is difficult, as it requires to measure several physical variables in an environment with severe conditions, in particular in terms of pressure, temperature, and radiation.

There are calculation methods for performing simulations of thermal power mainly supplied by the reactor. These methods are however complex to implement, and their accuracy error remains greater than 5% of the power actually supplied.

Alternatively, the pressure of the heat-transfer fluid can be determined in the core of the reactor, and the heat equation can be used to obtain the thermal power. For this, several parameters are necessary, such as the temperature of the heat-transfer fluid at the inlet and at the outlet of the core of the reactor, and the flow rate of the heat-transfer fluid. To determine the flow rate of the heat-transfer fluid, a first solution is to measure the pressure difference between the inlet and outlet heat-transfer fluid supply lines of the tank of the reactor, commonly called hot branches and cold branches. However, this solution only gives overall information to the scale of the core of the reactor. Furthermore, this solution has an increased uncertainty. The uncertainty in accuracy of the actual power even then remains greater than 5% of the actual value.

A device for measuring the flow rate of the heat-transfer fluid at the inlet of the core of a nuclear reactor is moreover known from document FR2413757 A1. The device comprises a rotor comprising a magnetic element. The rotation speed of the turbine is measured by an electromagnetic reading, to deduce the flow rate of the heat-transfer fluid from it. In practice, it has proven to be that this solution has a reliability and a limited accuracy.

An aim of the present invention is therefore to propose a solution enabling to determine the power generated by an assembly of a nuclear reactor, even an assembly of a nuclear reactor, with a greater accuracy than in the current solutions.

Other aims, characteristics and advantages of the present invention will appear upon examining the following description and the accompanying drawings. It is understood that other advantages can be incorporated.

SUMMARY

To achieve this aim, according to an embodiment, a system for determining a power generated by an assembly for a nuclear reactor is provided, intended to be immersed in a heat-transfer fluid, comprising:
  a subsystem for measuring the flow rate of the heat-transfer fluid, comprising
    a body comprising at least one inlet, at least one outlet and at least one passage for the flow of the heat-transfer fluid from the inlet to the outlet,
    at least one rotor disposed inside the passage and configured to be rotated, by the flow of the heat-transfer fluid about an axis substantially parallel to the flow direction of the heat-transfer fluid in the passage,
    a device for measuring a rotation speed of the rotor.
  Advantageously, the measuring device comprises:
  a module for emitting an incident light radiation having a wavelength greater than 1200 nm ($10^{-9}$ m),
  an optical module configured to
    transmit the incident light radiation from the emission module onto the rotor blades, such that the incident light radiation is incident on the rotor blades according to a direction substantially perpendicular to the axis of rotation of the rotor, and
    receive a reflected light radiation, the reflected light radiation coming from the reflection, on the rotor blades, of the incident light radiation,
  a first conversion module configured to
    determine the rotation speed of the rotor according to the reflected radiation and
    determine the flow rate of the heat-transfer fluid according to the rotation speed of the rotor.
  The system further comprises:
  a subsystem for measuring a temperature of the heat-transfer fluid at the inlet of the assembly and a temperature of the heat-transfer fluid at the outlet of the assembly, and
  a second conversion module configured to determine a power generated by the assembly according to at least the flow rate of the heat-transfer fluid and a difference between the temperature of the heat-transfer fluid at the inlet and the assembly and the temperature of the heat-transfer fluid at the outlet of the assembly.

The subsystem for measuring the flow rate of the heat-transfer fluid enables an optical measurement of the rotation speed of the rotor. Thus, the sensitivity to the electromagnetic environment around the measuring subsystem is limited, even avoided. The measurement of the heat-transfer fluid flowing around or along the assembly is therefore made more reliable and more accurate.

Moreover, in the scope of the development of the present invention, it has been noted that the solution described in document FR2413757 A1, based on a measurement of the rotation speed of a rotor by an electromagnetic reading, has a low accuracy due to its sensitivity to the nearby electromagnetic environment. The solution proposed does not have any sensitivity to the electromagnetic environment.

Furthermore, a detection based on a magnetic effect imposes constraints on the constitutive materials of the device. On the contrary, the solution of the present invention, based on an optical measurement, enables to reduce the constraints on the constitutive materials of the assembly.

The subsystem for measuring the flow rate enables a measuring of the flow rate of the heat-transfer fluid locally at the assembly. The accuracy of the measurement is thus reinforced, in particular with respect to the solutions for measuring the pressure difference between the hot and cold branches of the reactor. Determining the power generated by the assembly is thus made more accurate. Furthermore, the measuring system advantageously enables a simplified determination, online and in real time, of this power with respect in particular to the simulations of the thermal power which demand a long calculation time.

The incident radiation is further applied radially on the rotor, by the optical module. In the flow direction of the heat-transfer fluid, the bulk of the optical module is therefore reduced with respect to the current solutions. When the heat-transfer fluid flows into the subsystem for measuring the flow rate at the rotor, turbulences of the current lines are induced. With the optical module not being disposed in the flow direction of the fluid, but perpendicularly to it, the impact of these turbulences on the optical module are minimised. The accuracy in measuring the flow rate is therefore increased with respect to the current solutions.

Furthermore, with the optical module not being disposed along the flow of the heat-transfer fluid, this flow is not disrupted by measuring the flow rate. In particular, this arrangement minimises load losses in the flow of the fluid. The impact of the measurement on the flow of the fluid is thus minimised, with respect to the current solutions.

The subsystem for measuring the flow rate consequently enables an accurate and reliable measurement of the flow rate of the heat-transfer fluid, and in particular with an accuracy in a range of +1% with respect to the actual value.

Thanks to measuring the temperature of the heat-transfer fluid at the inlet of the assembly and of the temperature of the heat-transfer fluid at the outlet of the assembly, the system consequently enables an accurate and reliable measurement of the power generated by an assembly, and in particular with an accuracy in a range of +1% with respect to the actual value.

Another solution would have been able to consist of providing to apply the incident light radiation radially on a dedicated part, having the marks enabling this to be read. With respect to this solution, the system proposed by the present invention:
- reduces the disruption of the flow by minimising the bulk of the subsystem for measuring the flow rate in the flow direction of the heat-transfer fluid,
- has a more accurate and reliable measurement of the flow rate,
- has a reduced number of parts. The system for determining the power is therefore made simpler and more reliable.

A second aspect relates to a nuclear reactor comprising:
a tank wherein a heat-transfer fluid circulates, and
a set of assemblies disposed in the tank, at least one assembly of the set comprising a system for determining a power generated by an assembly according to the first aspect of the invention.

According to an example, the tank is separate from the body of the subsystem for measuring the flow rate.

According to an example, at least some of the assemblies each comprise the system for determining a power generated by an assembly according to the first aspect.

According to an example, the reactor is a light water reactor.

According to an example, the heat-transfer fluid circulating in the tank is at a pressure less than 200 bar, at a temperature less than 350° C. and flows at a flow rate of between 0.05 and 25000 m$^3$/h.

The nuclear reactor can comprise a tank wherein a heat-transfer fluid circulates and at least one system for determining a power generated by an assembly and immersed in the heat-transfer fluid. The system for determining a power can have any characteristic of the system for determining a power according to the first aspect of the invention.

A third aspect relates to a method for determining a power generated by an assembly for a nuclear reactor by a system for determining a power generated according to the first aspect of the invention and/or a nuclear reactor according to the second aspect of the invention, comprising at least:
a measurement of a flow rate of the heat-transfer fluid comprising at least:
an emission by the emission module, of an incident light radiation having a wavelength greater than 1200 nm, then
a transmission, by the optical module, of the incident light radiation from the emission module on the rotor blades, such that the incident light radiation is incident on the rotor blades in a direction substantially perpendicular to the axis of rotation of the rotor, then
a reflection of the incident light radiation on the rotor blades, then
a reception, by the optical module, of the reflected light radiation, then
a conversion, by the conversion module, of the reflected light radiation so as to determine the rotation speed of the rotor, when to determine the flow rate of the heat-transfer fluid according to the rotation speed of the rotor, and
a measurement of a temperature of the heat-transfer fluid at the inlet of the assembly and of a temperature of the heat-transfer fluid at the outlet of the assembly, and
a conversion of power generated by the nuclear reactor from at least the flow rate of the heat-transfer fluid, and of a difference between the temperature of the heat-transfer fluid at the inlet of the assembly and the temperature of the heat-transfer fluid at the outlet of the assembly.

According to an example, the method can further comprise a measurement of the pressure of the heat-transfer fluid.

According to an example, the measurement of one from among the temperature of the heat-transfer fluid at the inlet of the assembly and the temperature of the heat-transfer fluid at the outlet of the assembly is obtained from the reflected light radiation.

According to an example, the nuclear reactor comprising a tank wherein the heat-transfer fluid circulates, the heat-transfer fluid circulating in the tank is at a pressure less than 200 bar, at a temperature less than 350° C. and flows at a flow rate of between 0.05 and 25000 m$^3$/h.

BRIEF DESCRIPTION OF THE FIGURES

The aims, objective, as well as the characteristics and advantages of the invention will best emerge from the detailed description of an embodiment of the latter, which is illustrated by the following accompanying drawings, wherein.

The drawings are given as examples and are not limiting of the invention. They constitute principle schematic representations intended to facilitate the understanding of the invention and are not necessarily to the scale of practical applications. In particular, the relative dimensions of the system and of the nuclear reactor are not necessarily representative of reality.

DETAILED DESCRIPTION

Before starting a detailed review of embodiments of the invention, below are stated optional characteristics of the system for determining the power generated which can possibly be used in association or alternatively:

according to an example, the body is configured to be housed in the assembly. The longitudinal direction in which the passage extends from the inlet to the outlet is parallel to a main direction in which the assembly extends, according to an example, the passage extends from its inlet to its outlet in a longitudinal direction. The passage is substantially rectilinear. Preferably, it has no bend. The flow direction of the heat-transfer fluid in the passage is parallel to the longitudinal direction of the passage. The longitudinal direction of the passage is parallel to a main direction in which the assembly extends. Thus, the flow of the heat-transfer fluid in the passage and the longitudinal direction of the channel are parallel to the favoured flow direction of the heat-transfer fluid along the assembly. Consequently, the subsystem for measuring the flow rate does not disrupt the flow of the heat-transfer fluid inside the assembly and inside the core. This enables to also improve the accuracy of the measurement of the flow rate, according to an example, the flow direction of the heat-transfer fluid in the passage is parallel to the longitudinal direction of the passage, according to an example, the heat-transfer fluid is not a liquid metal such as sodium. According to an example, the heat-transfer fluid is water or water-based, according to an example, the measuring device comprises a module for connecting the optical module to the body, configured to establish a heat-transfer fluid-sealed junction between the optical module and the passage, and transparent to the incident and reflected light radiations. Thus, the optical module is not in direct contact with the heat-transfer fluid, of which the flow is sought to be measured. The subsystem for measuring the flow rate therefore offers a satisfactory accuracy in the environment under severe conditions of the core of a nuclear reactor, according to an example, the optical module comprising a portion for transmitting the incident light radiation disposed, in the direction substantially perpendicular to the axis of rotation of the rotor, at a distance less than 1 cm, preferably 5 mm, preferably 2 mm, of the outer diameter of the rotor. The optical module thus enables a measurement as close as possible to the rotor blades. The accuracy of the measurement of the flow rate is therefore maintained in the possibility where the heat-transfer fluid comprises inhomogeneities, according to an example, the optical module is configured to be separated from the rotor at least by the heat-transfer fluid. According to an example, the portion for transmitting the incident light radiation is disposed, in the direction substantially perpendicular to the axis of rotation of the rotor, at a non-zero distance from the outer diameter of the rotor, according to an example, the optical module comprising an optical fibre. According to an example, the optical fibre has, between the transmission portion and at least one from among the emission module and the reception module, a length greater than 1 m, even 50 m, according to an example, the optical module comprises an optical fibre detected nearby, according to an example, the optical module is configured to transmit the reflected light radiation to the conversion module, for example by way of a reception module, according to an example, the body has an outer wall configured to be in contact with the heat-transfer fluid, according to an example, the rotor further comprises a plurality of blades, at least one blade having a reflection coefficient of the different light radiation, for example less than the reflection coefficient of the light radiation of at least one other blade. The rotor blades have different reflection coefficients, the light radius has a more or less significant reflection according to the blades. The reflected light radiation is therefore modulated according to the blades on which it is reflected, which facilitates and increases reliability of determining the rotation/time unit number of the rotor. The accuracy of the measurement of the flow rate can therefore thus also be improved. This solution is clearly distinguished from solutions implementing reflection surfaces on each blade of a rotor, according to an example, the assembly of the at least one blade is made of a material separate from a constitutive material of the assembly of the at least one other blade, which has a reflection coefficient of the different light radiation, for example less than the constitute material of the at least one other blade, according to an alternative example, at least one blade is coated with a coating different from a coating and/or a material of the at least one other blade, so as to have a reflection coefficient of the different light radiation, for example less than the constitute material of the at least one other blade, according to an example, the rotor comprises one single blade having a reflection coefficient of the different light radiation, for example less than at least one other blade, according to an example, the rotor comprises one single blade having a reflection coefficient of the light radiation greater than at least one other blade, according to an example, the rotor comprises a plurality of blades, at least one blade being made of a material having a reflection coefficient of the light radiation less than that of a constitutive material of the other blades, according to an example, the rotor comprises at least four blades, at least two blades being made of plastic material and at least two blades being made of metal, preferably said at least two blades made of metal are made of stainless steel, according to an example, each blade is only made of one material. Thus, the manufacturing of the rotor and therefore of the system is simplified. The reflection difference between the blades is produced over the whole surface of the blades on which the radiation is reflected, also improving the accuracy in measuring the flow rate, according to an example, the rotor blades alternatively have separate reflection coefficients. The modulation of the reflected light radiation is thus produced according to the successive blades on which the light radiation is reflected, according to an example, the emission module comprises a laser source. According to this example, the conversion module can comprise a laser interferometer, according to an example, the optical module comprises an optical fibre comprising a Bragg network, according to an example, the system further comprises at least one pressure sensor configured to measure a parameter relating to a pressure of the heat-transfer fluid flowing in the body, this parameter being, for example, the pressure of the fluid, preferably the at least one pressure sensor is carried by the subsystem for measuring the flow rate of the heat-transfer fluid. This enables to collect more data on the heat-transfer fluid, while preserving a limited bulk and by simplifying the mounting and the maintenance of the system.

It is noted that the measuring method can have any step resulting from the implementation of a characteristic of the system for determining the power generated.

In the present patent application, when it is indicated that two parts are separate, this means that these parts are separated. They are:

positioned at distances from one another, and/or
movable against one another, and/or
integral with one another by being fixed by applied elements, this fixing being demountable of not.

One single-piece unitary part cannot therefore be constituted of two separate parts.

In the following detailed description, use can be made of terms such as "longitudinal", "transverse", "upper", "lower", "top", "bottom", "front", "rear", "inner", "outer". These terms must be interpreted relatively in relation to the normal position of the equipment and/or of the system. For example, the "longitudinal" direction corresponds to the main extension direction of the module for actuating the subsystem for measuring the flow rate.

Also, a reference will be used, the longitudinal or front/rear direction of which corresponds to the x-axis, the transverse or left/right direction of which corresponds to the y-axis, and the top/bottom direction of which corresponds to the z-axis.

"Inner" means the elements or the faces rotated inwards from the equipment and/or from the subsystem for measuring the flow rate, and "outer" means the elements or the faces rotated outwards from the equipment and/or from the subsystem for measuring the flow rate.

By a parameter "substantially equal to/greater than/less than" a given value, this means that this parameter is equal to/greater than/less than the given value, by more or less almost 10%, even by more or less almost 5%, of this value.

In the present patent application, it is considered that the fluid is liquid when the fluid is at least partially, even totally, in the liquid state. Therefore, it is not excluded that the fluid is partially in the gaseous state, nor that the fluid comprises a solid fraction.

Figure 1:
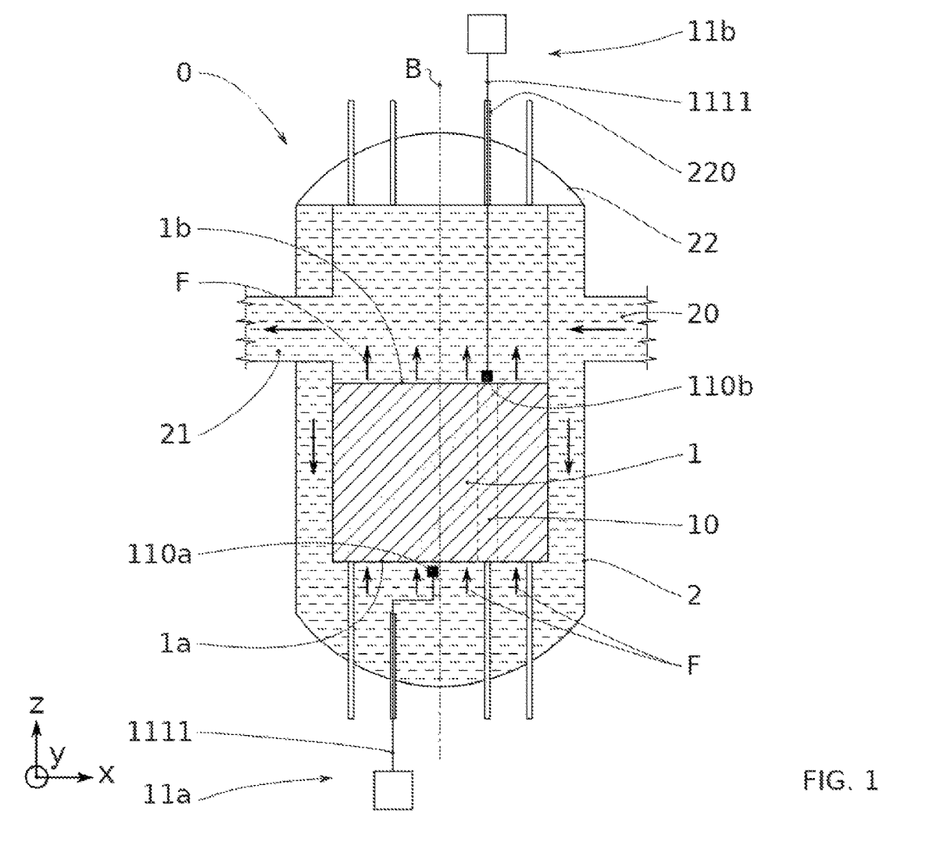
FIG. 1 represents a longitudinal cross-sectional view of a tank of a nuclear reactor according to an example of an embodiment of the invention.

The system for determining the power generated by an assembly 10 for a nuclear reactor and the associated nuclear reactor 0, are now described in reference to FIG. 1. The reactor 0 comprises a tank 2 wherein the core 1 is disposed. The nuclear combustible is presented in the form of assemblies 10. For clarity, only one assembly 10 is illustrated in FIG. 1. An assembly can comprise a bundle of rods. These rods are typically connected by a rigid structure, for example constituted of tubes and grids. The assemblies 10 are disposed to the side of one another in the tank 2 of the reactor 0. As an example, substantially 205 assemblies 10 are counted in the core 1 for a reactor 0 of a power of 1450MWe. There are different types of assemblies 10 in the core according to the main function that they are intended to fulfil. The system for determining the power generated which will be described in detail below is preferably carried by a combustible assembly. However, this system for determining the power generated can also be carried by other types of assemblies, for example taken from among the following assemblies:

lateral neutron protection assemblies,
neutron guides,
reflectors,
dilutants.

During the operation of the reactor 0, the assemblies 10 are passed through by the heat-transfer fluid of the primary circuit. The assemblies 10 extend in a main direction. Most often, its main direction is vertical. The heat-transfer fluid flows around and through the assembly according to its main direction. The assemblies 10 are typically passed through from bottom to top by the fluid, for example from the lower end 1a of the core 1 to its upper end 1b as illustrated by the arrows F in FIG. 1. In the case of assemblies carrying the combustible material, the heat-transfer fluid is heat upon their contact and remove the thermal energy generated by fission. To convey the heat-transfer fluid from the primary circuit to the core 1, the tank of the reactor comprises a fluid inlet 20, which could be named by the term "cold branch". At the outlet of the core 1, the fluid circulates to an outlet 21, which could be named by the term "hot branch".

The inside of the tank 2 of a reactor, and more specifically at the core 1, constitutes an environment under severe conditions, in terms of pressure and of high temperatures, and of radiations. According to an example, the heat-transfer fluid circulating in the tank 2 of the reactor 0 is at a pressure less than 200 bar, even at a pressure of between 50 and 200 bar, even between 100 and 200 bar. The heat-transfer fluid circulating in the tank 2 of the reactor 0 can be at a temperature less than 350° C., even between 250° C. and 350° C.

The heat-transfer fluid can flow at a flow rate of between 0.05 and 25000 m³/h. At the core 1, the flow of thermal neutrons can be greater than $10^{14}$ n.cm$^{-2}$.s$^{-1}$. The heat-transfer fluid is a liquid. According to an example, the heat-transfer fluid is not a liquid metal such as sodium. According to an example, the reactor 0 is a light water nuclear reactor (LWR). An LWR is a nuclear reactor, the heat-transfer fluid of the combustible of which is water, also called light water, distinguished from heavy water. The most common LWRs are pressurised water reactors (PWRs) and boiling water reactors (BWRs). Below, the non-limiting example is referred to, wherein the reactor 0 is an LWR. In a PWR, the water is typically at a pressure substantially of 155 bar and at a temperature substantially of 320° C. As an example of PWR, the Jules Horowitz reactor can be cited, which will be equipped with a PWR device in its pool-type reactor core. In a BWR, the water is typically at a pressure substantially of 80 bar and at a temperature substantially of 280° C.

It is sought to determine the power generated by an assembly 10. For this, it is sought to measure a temperature of the heat-transfer fluid at the inlet of the assembly 10, a temperature of the heat-transfer fluid at the outlet of the assembly 10, and the flow rate of the heat-transfer fluid in the tank 2 of the reactor 0. In particular, an aim can be to determine 37 the thermal power mainly supplied by the reactor. For this, the core 1 comprises a set of assemblies 10, wherein at least one assembly 10 comprises a system for determining the power generated.

The system for determining the power generated comprises a subsystem for measuring a temperature at the inlet of the assembly 10 and a temperature at the outlet of the assembly 10. As subsequently detailed, according to an example, the subsystem for measuring temperature can comprise temperature sensors additional to the subsystem for measuring 11 the flow rate of the heat-transfer fluid. According to another example, the subsystem for measuring 11 the flow rate can be combined with the subsystem for measuring temperature. A subsystem for measuring 11 the flow rate can thus be placed at the inlet of the assembly 10. A second subsystem for measuring 11 the flow rate can thus be placed at the outlet of the assembly 10.

Figure 2:
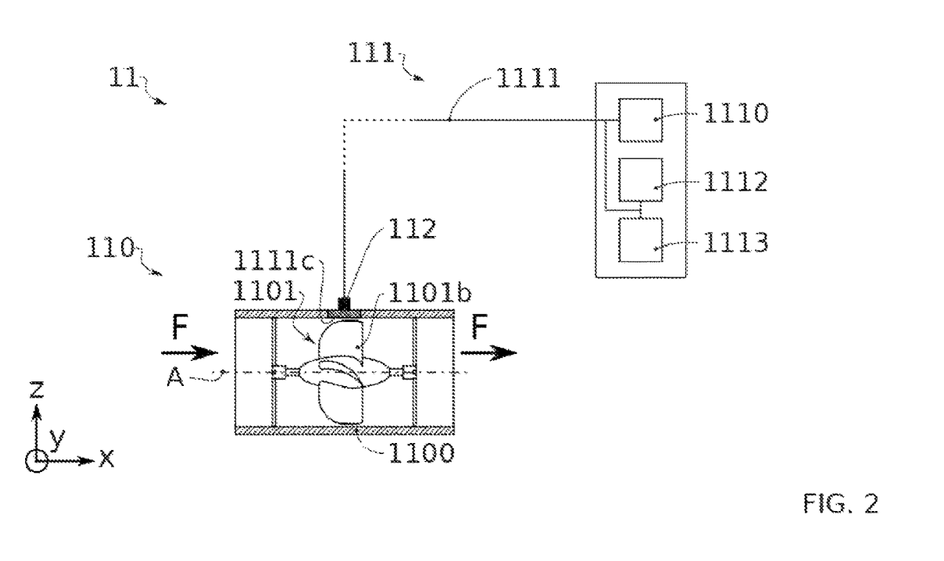
FIG. 2 represents an assembly view of the subsystem for measuring the flow rate according to an example of an embodiment of the invention.
Figure 3:
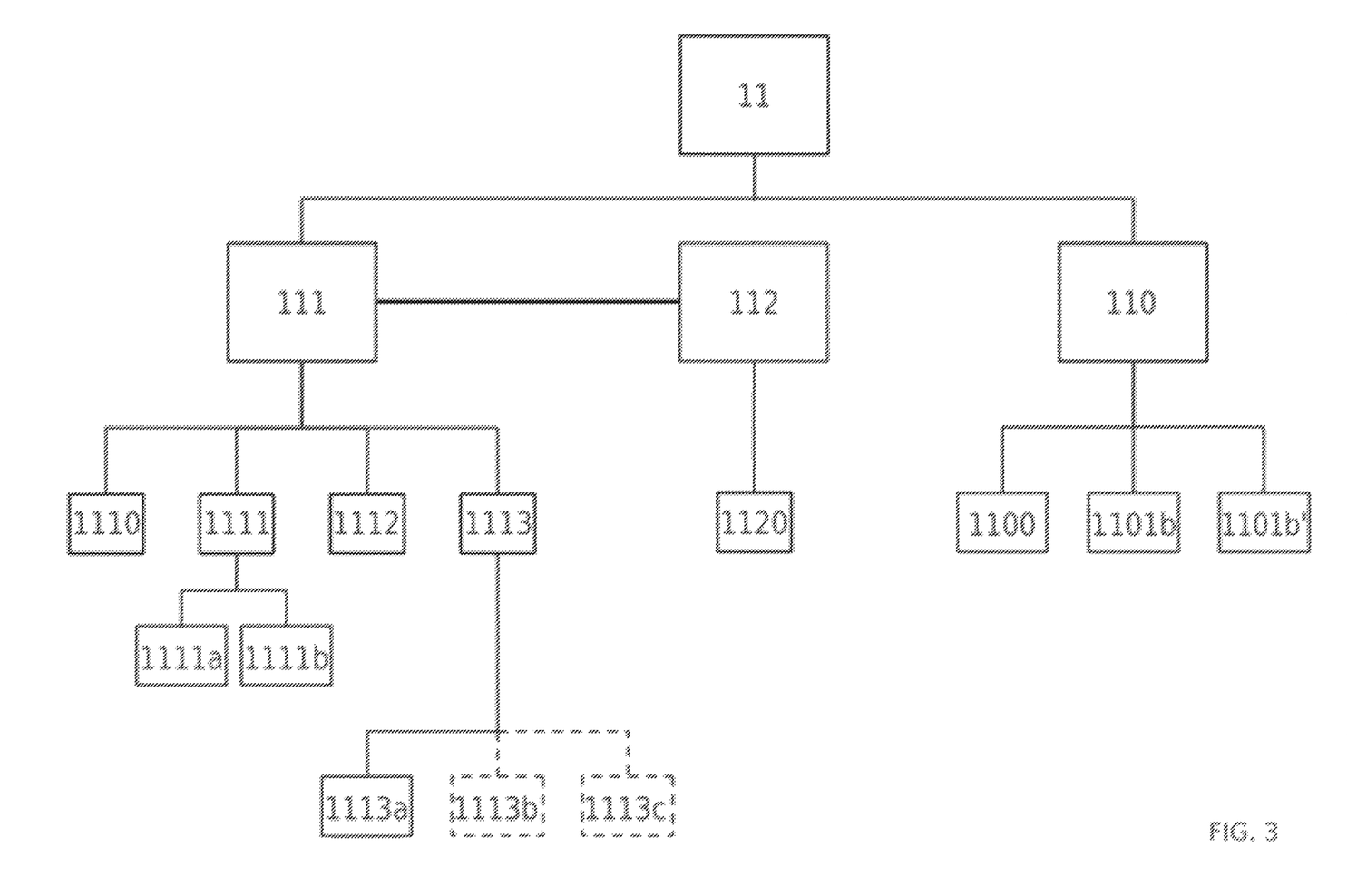
FIG. 3 represents a functional diagram of the subsystem for measuring the flow rate according to an example of an embodiment of the invention.

The system for determining the power generated comprises a subsystem 11 for measuring the flow rate of the heat-transfer fluid. As illustrated in FIG. 2 and in the functional diagram in FIG. 3, the subsystem 11 comprises an actuating module 110, configured to be driven by the flow of the fluid, represented by the arrows F in FIGS. 1 and 2. The actuating module 110 comprises a body 1100 wherein the fluid flows, for example, in the longitudinal direction x. The actuating module 110 further comprises at least one rotor 1101 disposed inside the body 1100. The rotor 1101 is configured to be rotated about the axis A. The axis of rotation A is substantially parallel to the flow direction x in the body 1100.

The subsystem 11 further comprises a device for measuring 111 the rotation speed of the rotor 1101. The measuring device 111 is configured to optically determine the rotation speed of the rotor 1101. For this, and as illustrated in the functional diagram in FIG. 3, the measuring device 111 can comprise a module for emitting 1110 a light radiation, an optical module 1111, a reception module 1112 of the light radiation and a conversion module 1113.

Figure 4A:
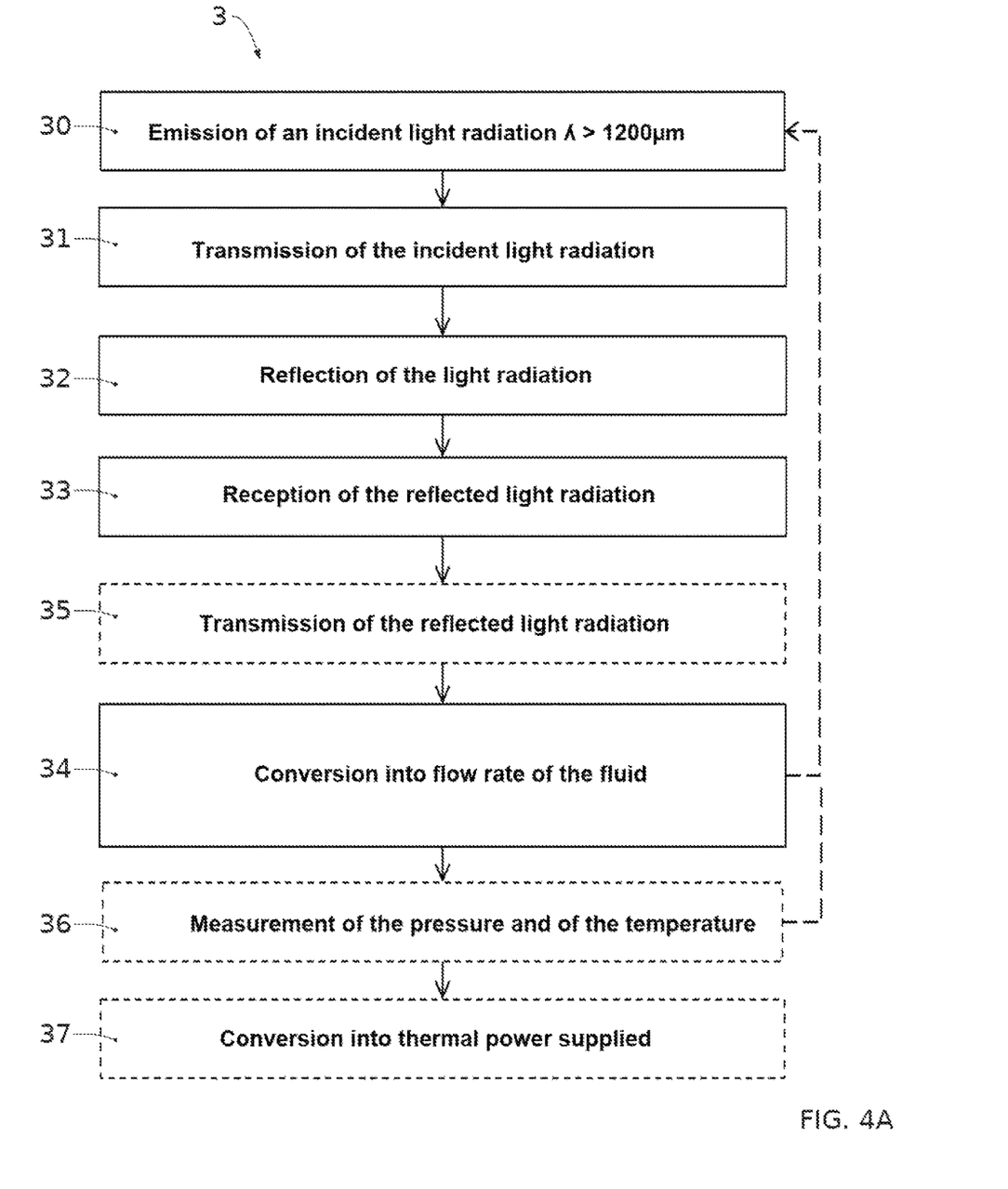
FIGS. 4A and 4B illustrate in a simplified manner, the steps of a method for measuring the flow rate of the heat-transfer fluid according to different examples of an embodiment of the invention.
Figure 4B:
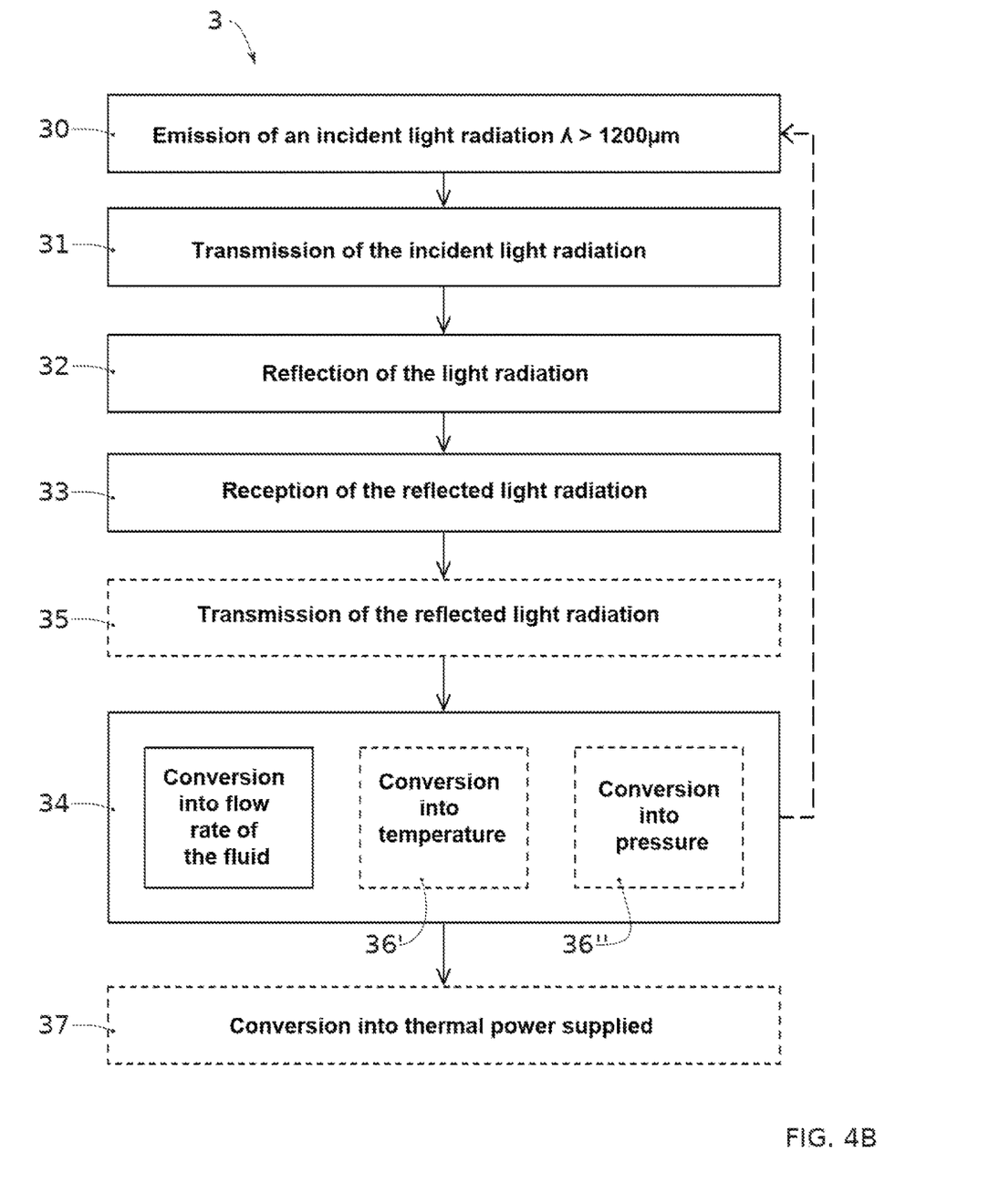

The functioning kinetics of the system for determining a power generated and the method 3 for measuring the power generated are now described relative to FIGS. 2, 4A and 4B. In FIGS. 4A and 4B, optional steps are indicated as a dotted line. The emission module 1110 emits 30 a so-called incident light radiation. The radiation has a wavelength of greater than 1200 nm. The radiation has, more specifically, a wavelength of greater than 1200 nm during its propagation in the fluid. According to an example, the radiation has a wavelength of less than 1300 nm. The radiation has, more specifically, a wavelength of less than 1300 nm during its propagation in the fluid. This wavelength range enables the propagation of the light radiation in the heat-transfer fluid under irradiation conditions in the tank of the reactor 0, and more specifically at the assemblies 10. The attenuation of the signal due to the radiations is minimised, and preferably avoided. An accurate and reliable optical measurement of the flow rate of the heat-transfer fluid is consequently enabled by the subsystem 11.

The optical module 1111 is configured to transmit 31 the incident light radiation from the emission module 1110 to the actuating module 110, and more specifically to the rotor 1101 rotated by the fluid. At the rotor 1101, the incident light radiation is reflected 32 on the rotor 1101 blades 1101*b*. The optical module 1111 is configured to receive the reflected light 10) radiation. The optical module 1111 can then transmit 35 the reflected light radiation to the first conversion module 1113. This transmission 35 can be made by way of the reception module 1112, configured to transform the reflected light radiation into a corresponding physical signal, for example an electrical signal. The first conversion module 1113 can comprise the reception module 1112.

The reflected light radiation is modulated according to the rotation of the blades 1101*b* about the axis A. For example, the intensity of the reflected light radiation is modulated by the rotation of the blades 1101*b*. The first conversion module 1113 is configured to convert the reflected radiation, or the corresponding physical signal, into a number of rotations of the rotor 1101 per time unit, which corresponds to the rotation speed of the rotor 1101. According to the rotation speed of the rotor 1101, the first conversion module 1113 is configured to determine the flow rate of the fluid. The first conversion module 1113 thus enables to convert 34 the reflected radiation into the flow rate of the heat-transfer fluid.

The method 3 further comprises a measurement 36 of the temperature, and preferably of the pressure and of the temperature. It is noted that this measurement 36 can be taken by additional sensors, at any moment of the method 3 and independently from the optical measurement. This measurement 36 can alternatively or complementarily be taken according to the reflected light radiation. These two examples will be described in more detail later.

From the flow rate, the temperature and the pressure of the heat-transfer fluid 30) determined beforehand, a second conversion module can be configured to determine 37 the thermal power generated by the assembly, even supplied by the reactor 0. Thus, the system for determining the power generated enables an accurate measurement, online and in real time of this thermal power. The first conversion module 1113 and the second conversion module can be combined. Below, "conversion module 1113" equally means either of these modules.

The measuring method 3 can further be repeated, as illustrated in FIGS. 4A and 4B, in order to temporally monitor the flow rate of the fluid, even further the temperature and the pressure of the fluid.

Furthermore, the optical module 1111 is configured such that the incident light radiation is incident on the rotor 1101 blades 1101*b* in a direction z substantially perpendicular to the axis A of rotation of the rotor 1101. The optical module 1111 can comprise a transmission portion 1111c of the incident light radiation, configured to transmit the incident light radiation from the optical module 1111 to the actuating module 110. The transmission portion 1111c can enable the passage of the incident radiation and of the reflected radiation to the optical module 1111. The transmission portion 1111c can extend in the direction z substantially perpendicular to the axis A of rotation of the rotor 1101. The bulk of the optical module 1111 is minimised in the direction x. Thus, the load losses in the flow of the fluid are minimised. The subsystem 11 for measuring the flow rate therefore enables an accurate and reliable measurement of the fluid, and in particular an accuracy of less than 1% of the value to be measured. By accuracy, this means in particular the percentage of error of the value measured, with respect to the actual value.

The flow rate of the fluid can moreover vary locally according to the structure of the assembly 10 and its arrangement in the core 1. During the operation of the reactor 0, local load losses can occur. These load losses can lead to local drops or increases in the flow rate of the fluid, and cause damage to the core 1. In order to measure the flow rate locally in different places of the core 1 of the reactor 0, several assemblies 10 can comprise the subsystem 11, and preferably the system for determining the power generated. The flow rate of the fluid can be measured simultaneously and accurately in different places of the core 1 to evaluate its spatial evolution, even spatial and temporal. The temperature of the heat-transfer fluid at the inlet of an assembly and the temperature at the outlet of an assembly can be measured simultaneously and accurately in different places of the core 1 to evaluate their spatial evolution, even spatial and temporal. The power generated by several assemblies can be measured in different places of the core 1 of the reactor 0. The operation of the reactor 0 can then be adapted according to these measurements.

According to an example, at least one third, even one quarter, of the assemblies 10 can comprise at least the subsystem 11 for measuring the flow rate, and preferably the system for determining the power. An accurate mapping of the power generated can thus be obtained. According to an example, these assemblies can be distributed homogenously in the core 1. According to another example, by assimilating the tank 2 to a cylindrical volume, this volume can be split into several portions. In a plane (x, y), each of these portions can extend from the top/bottom axis of the core 1 to the tank 2. The top/bottom axis of the core 1 corresponds to the axis of revolution B of the core 1, for example illustrated in FIG. 1. The assemblies 10 comprising at least the subsystem 11 for measuring the flow rate, and preferably the system for determining the power can be grouped together in at least one of these portions. For example, these assemblies 10 can be grouped together in a third, even a quarter of this volume. With the core 1 having a revolution symmetry about the axis B, it is possible to extrapolate the measurements taken by at least the subsystem 11 for measuring the flow rate, and preferably the system for determining the power, in a third, even a quarter, of this volume to obtain the mapping of the flow rate in the core 1. Generally, the assemblies 10 of the core 1 are partially renewed at a regular frequency, typically from 12 to 18 months. During this renewal, the subsystems 11 for measuring the flow rate, and preferably the systems for determining the power can be transferred on assemblies not yet equipped with the core 1, even another portion of the core 1.

The relative arrangement of the different modules of the subsystem 11 is now described in reference to FIGS. 1 and 2. The actuating module 110 can be disposed at an assembly 10, at an end of the core 1, for example on a support plate of an assembly 10. As illustrated in FIG. 1, the actuating module 110a of a subsystem 11a can be disposed at the lower end 1a of the core 1. The actuating module 110b of a subsystem 11b can be disposed at the upper end 1b of the core 1.

According to an example, the actuating module 110 is mounted on the assembly 10 removably manually, or by way of tools. Thus, the actuating module 110 can be introduced and removed if needed from the assembly 10, for example for its transfer onto another assembly 10.

According to an example, the optical module 1111 comprises a waveguide, and more specifically, an optical fibre 1111a. As illustrated in FIG. 2, the optical fibre 1111a can extend between the transmission portion 1111c and the emission module 1110. The optical fibre 1111a can extend between the transmission portion 1111c and at least one from among the reception module 1112 and the conversion module 1113. The optical fibre 1111a enables to move the emission module 1110 and the conversion module 1113 of the rotor 1101 on which the measurement is taken. The subsystem 11 is therefore adapted to the measurement of the flow rate of a fluid in an environment having a restricted geometry, as is the case in the core 1 of a reactor 0. The subsystem 11 is further adapted to the measurement of the flow rate of a fluid in the environment under severe conditions of the core 1, by avoiding a possible damaging of the emission module 1110, of the reception module 1112 and of the conversion module 1113. According to the example illustrated in FIG. 1, the optical fibre 1111a extends between the transmission portion 1111c and at least one from among the reception module 1112 and the conversion module 1113 by passing through the tank 2, for example, from the access conduits 220 of the cover 22. The transmission portion 1111c is preferably disposed at the distal end of the optical fibre 1111a. The optical fibre 1111a can have a length greater than 1 m, even 50 m, between the transmission portion and: the emission module 1110, and/or the reception module 1112, and/or the conversion module 1113.

Figure 5A:
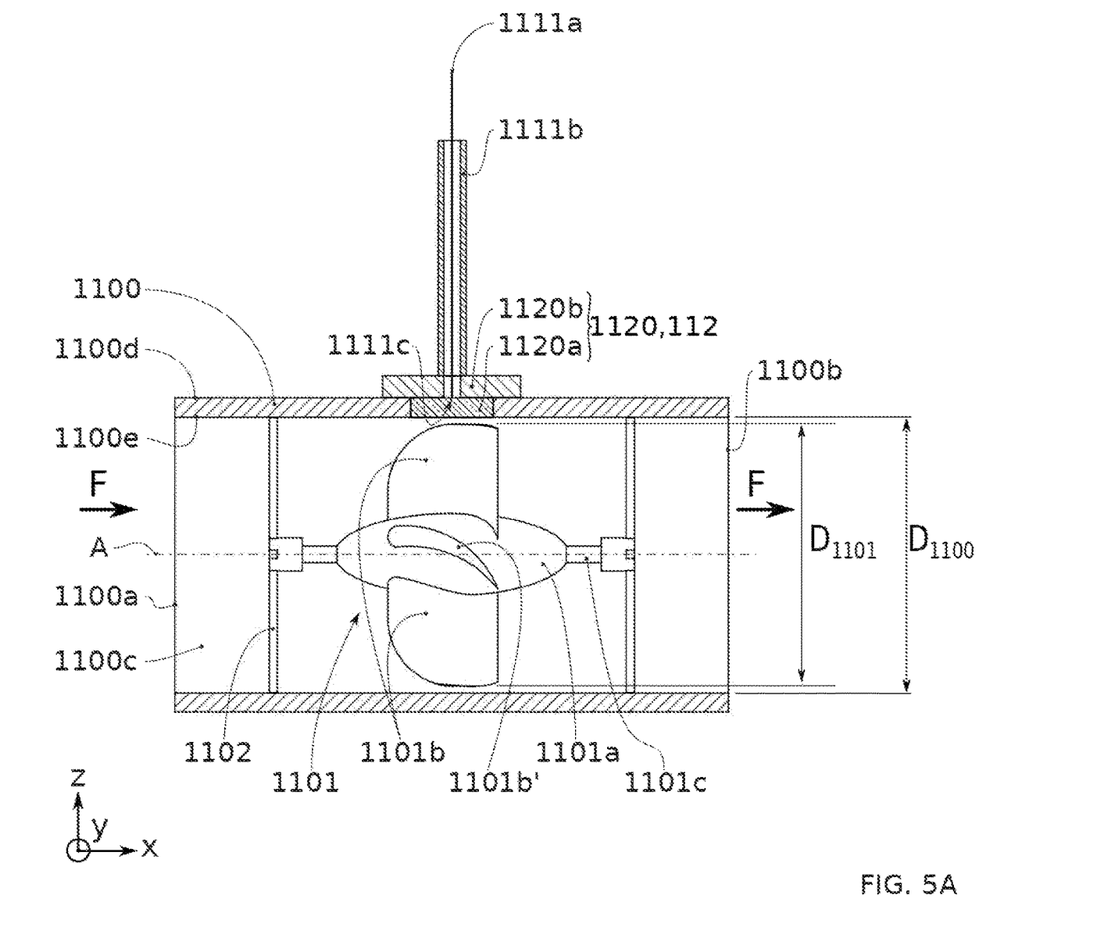
FIGS. 5A and 5B represent a longitudinal cross-sectional view of the module for actuating the subsystem for measuring the flow rate according to several examples of embodiment.
Figure 5B:
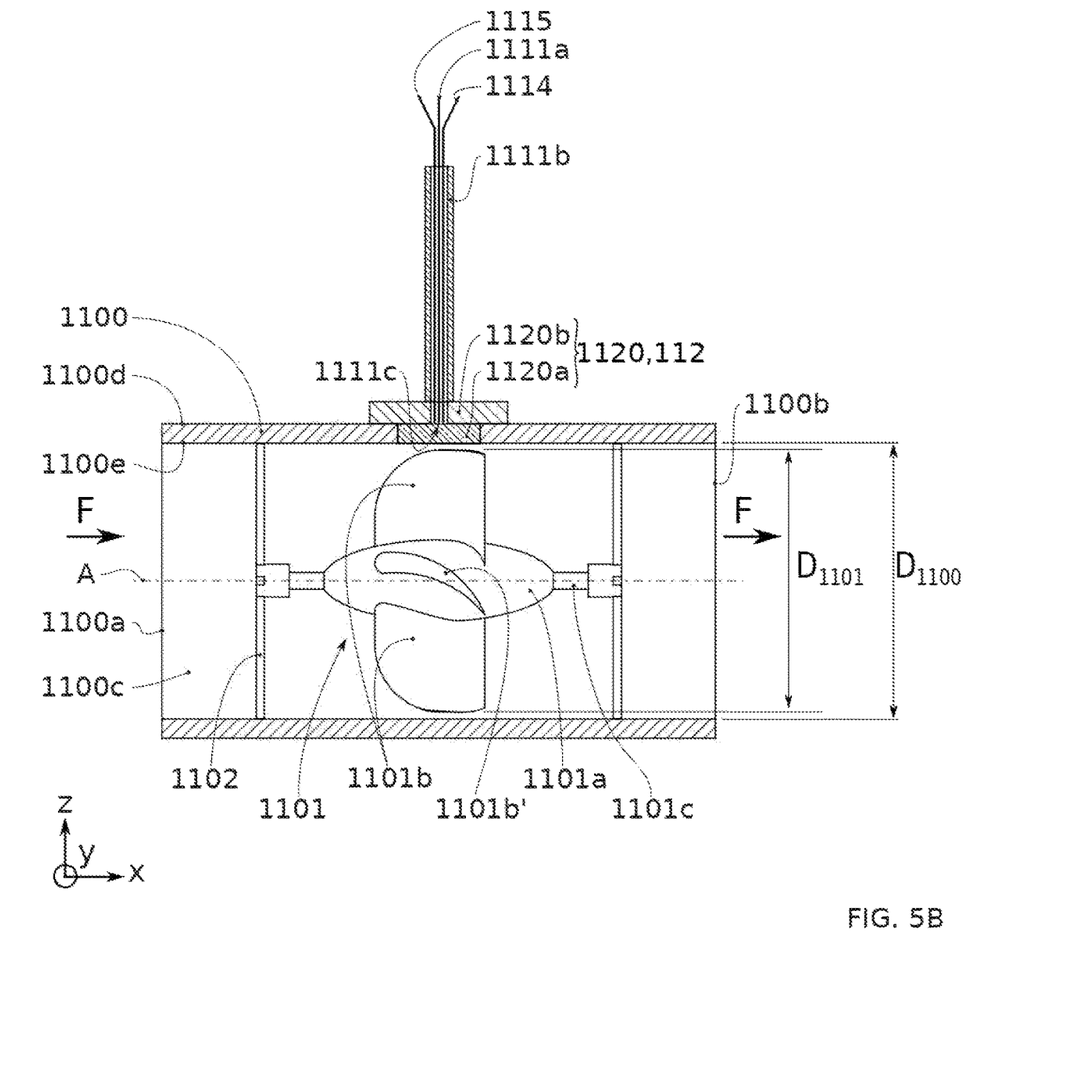

As illustrated in FIGS. 5A and 5B, the optical fibre 1111a can be disposed inside a sleeve 1111b, also called hollow cable connecting the actuating module 110 to the emission module 1110 and/or to the reception module 1112 and/or to the conversion module 1113, even to an assembly formed by these three modules. Preferably, the sleeve 1111b is configured to avoid a local folding of the optical fibre 1111a. It is noted that the right angles of the optical module 1111 represented in FIG. 1 constitute a simplified and schematic representation of the path of the optical module 1111. The sleeve 1111b can be chosen to be difficult to deform in the flowing fluid, in particular according to the temperature and the pressure of the fluid. Preferably, the sleeve 1111b is sealed to the fluid. For example, the sleeve 1111b is made of metal, preferably made of stainless steel.

The measuring device 111 can further comprise a connection module 112 configured to ensure a sealed junction 1120 between the fluid and the optical module 1111. The sealed junction 1120 enables to avoid that the fluid penetrates into the optical module 1111. As illustrated in FIGS. 5A and 5B, the sealed junction 1120 can comprise a first part 1120a, disposed between the optical module 1111 and the fluid flowing in the body 1100 of the actuating module 110. This first part 1120a can in particular be disposed between the transmission portion 1111c of the optical module 1111 and the rotor 1101, on the optical path of the light radiation. This first part 1120a is therefore transparent to the light radiation used. For example, this first part is made of sapphire. According to an example, the first part 1120*a* has a thickness of less than 1 cm. The sealed junction 1120 can comprise a second part 1120*b*. This second part 1120 can be disposed between the body 1100 and the sleeve 1111*b* such that the fluid circulating outside of the body 1100 does not penetrate into the optical module 111. For example, this second part is made of stainless steel.

Figure 6:
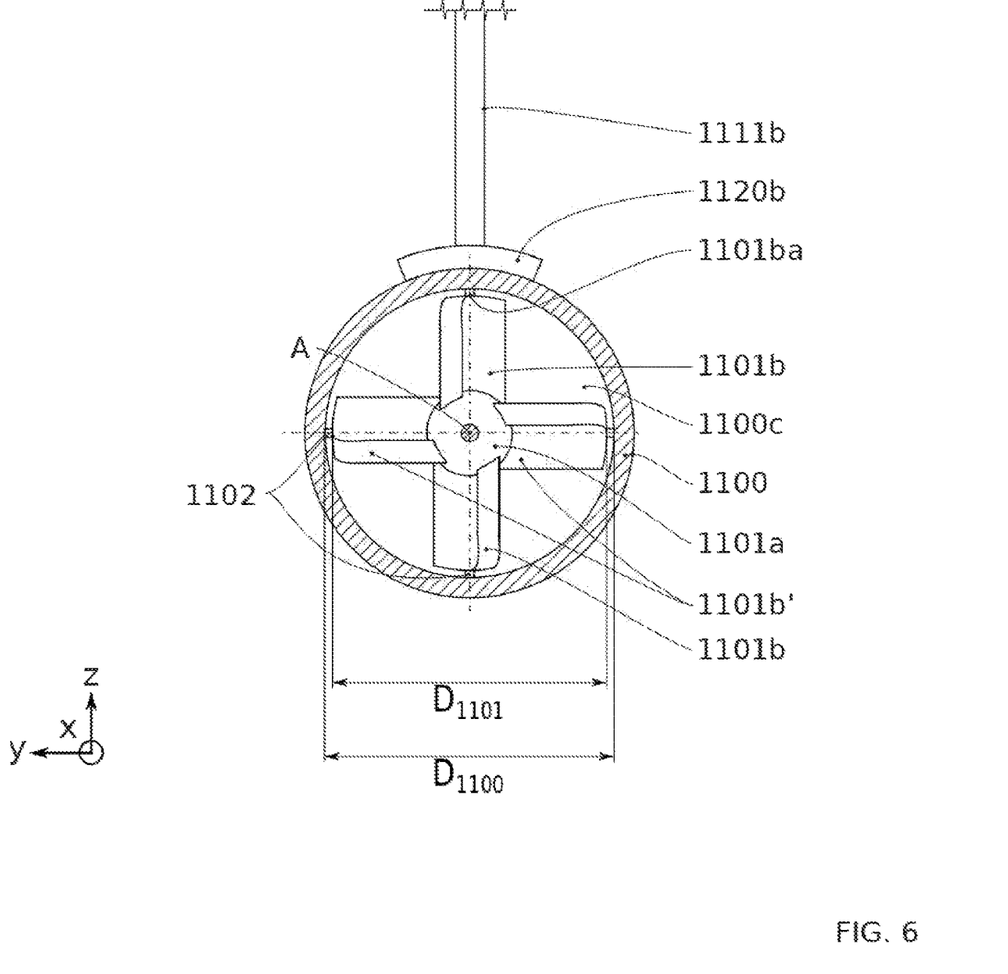
FIG. 6 represents a transverse cross-sectional view of the module for actuating the subsystem for measuring the flow rate illustrated in FIGS. 5A and 5B.

The actuating module 110 and its engagement with the optical module 1111 are now described in more detail, in reference to FIGS. 5A, 5B and 6. The body 1100 has at least one inlet 1100*a* and at least one outlet 1100*b*. It further has at least one passage 1100*c* for the flow of the fluid from the inlet 1100*a* to the outlet 1100*b*. The body 1100 can be disposed such that the passage 1100*c* is substantially parallel to the flow direction x of the fluid at the assembly 10, such that the measurement of the flow rate is as reliable as possible. Thus, preferably, the main extension direction of the assembly 10 and the favoured flow direction x of the heat-transfer fluid along the assembly 10 are parallel to the main extension direction of the body 1100 and to the flow direction of the fluid inside the passage 1000*c*. This enables to limit the disruptions of the heat-transfer fluid and to improve the accuracy of the measurement of the flow rate.

The body 1100 can have an outer wall 1100*d* configured to be in contact with the flowing fluid. Thus, the actuating module 110 and therefore the body 1100, as well as the rotor 1101 are immersed, preferably fully immersed, inside the reactor 0.

The body 1100 further has a passage opening of the optical module 1111. The transmission portion 1111*c* of the optical module 1111, and/or the first part 1120*a* of the sealed junction 1120, can be disposed in this opening so as to be flush with the inner face 1100*e* of the body 1100. Thus, the optical module 1111 is disposed closest to the rotor 1101 without penetrating into the passage 1100*c* of the fluid. A possible offset or a possible deformation of the transmission portion 1111*c* with respect to the rotor 1101 is avoided. The optical path of the light radiation is thus not impacted by the flow of the fluid. Furthermore, the inner hydraulic diameter of the body 1100 is thus not modified. The flow profile in the body 1100 is not disrupted by the optical module 1111.

The actuating module 110 comprises at least one rotor 1101, and preferably one single-piece single rotor 1101. Thus, the bulk of the rotor 1101 in the flow direction x of the fluid is minimised, which also minimises the load losses in the fluid. The rotor 1101 comprises a hub 1101*a* extending along the axis of rotation A, substantially parallel to the flow direction x of the fluid. The hub 1101*a* can be mounted on a shaft 1101*c*. The shaft 1101*c* can be mounted on a support 1102 extending at least from one point to another of the inner face 1100*e* of the body 1100. In a cutting plane (y, z) of the support 1102, the 25 support 1102 preferably occupies a fraction of less than 50%, even less than 70%, even less than 85% of the surface of the passage 1100*c*. Thus, the support minimises a load loss of the fluid during its passage in the actuating module 110.

The rotor 1101 comprises a plurality of blades 1101*b*, 1101*b'* extending radially to the axis of rotation A. The transmission portion 1111*c* and/or the first part 1120*a* of the sealed junction 1120, are disposed in the direction z perpendicular to the axis A of rotation of the rotor 1101, at a distance, preferably non-zero, less than 1 cm, preferably 5 mm, preferably 1 mm, of the outer diameter of the rotor 1101. If the heat-transfer fluid is inhomogeneous, the passage of solid particles between the transmission portion 1111*c* and the end 1101*ba* of the blades 1101*b*, 1001*b'* is thus limited, like for example illustrated in FIG. 6. The risk that a solid particle disrupts the passage of the light radiation is limited. For this, the outer diameter $D_{1101}$ of the rotor 1101, defined by the rotation of the distal ends 1101*ba* of the blades 1101*b*, 1101*b'*, can be determined by the following relationship:

$D_{1101} = D_{1100} - d$, with $D_{1100}$ the inner diameter of the body 1100 and d a distance, preferably non-zero, less than 1 cm, preferably 5 mm, preferably 1 mm.

It is noted that the characteristics of the rotor 1101 can further be chosen according to the flow rate range of the fluid to be measured. These characteristics can, for example, be the longitudinal dimension of the rotor 1101, and/or the number of blades 1101*b*, 1101*b'*.

According to an example, the rotor 1101 comprises blades 1101*b*, 1101*b'*, at least one blade 1101*b* being on the basis of or made from a material separate from that of one or more other blades 1101*b'*, or covered with a coating different from the coating or from the material of one or more other blades 1101*b'*. According to an example, at least one blade is on the basis of or made from a material separate from a constitutive material of the other blades and has a different light radiation reflection coefficient, for example, less than that of the other blade(s).

According to an example, the assembly of the at least one blade 1101*b* is made of a material separate from a constitutive material of the at least one other blade, which has a different light radiation reflection coefficient, for example, less than the constitutive material of the at least one other blade. According to an alternative example, at least one blade is coated with a coating different from a coating and/or a material of the at least one other blade, so as to have a different light radiation reflection coefficient, for example, less than the radiation reflection coefficient of the at least one other blade.

Each blade can more specifically be made only of one material. Thus, the manufacturing of the rotor and therefore of the system is simplified. According to an example, at least one blade can have a different light radiation reflection coefficient, less than or greater than that of at least one other blade. According to an example, at least one blade can be made of a material having a light radiation reflection coefficient less than that of the constitutive material of the other blades. The reflection coefficient can be defined by the reflected light radiation intensity to incident light radiation intensity ratio. Thus, the light radius has a more or less significant reflection according to the blades, for example, according to the constitutive material of the blades. The reflected light radiation is therefore modulated according to the blades on which it is reflected, which facilitates the determination of the number of rotations/time unit of the rotor. The accuracy of the measurement of the flow rate of the heat-transfer fluid can therefore thus be further improved.

When each blade 1101*b*, 1101*b'* is only made of a material or is fully coated by the coating, the reflection difference between the blades 1101*b* occurs on the whole surface of the blades on which the radiation is reflected. The determination of the number of rotations/time unit of the rotor 1101 is even more facilitated, further improving the accuracy of the measurement of the flow rate. The separate reflection coefficient materials can be metal, magnetic or not, preferably stainless steel and plastic.

According to an example, the blades 1101*b*, 1101*b'* of the rotor 1101 alternatively have separate reflection coefficients, for example they are alternatively made of materials having separate reflection coefficients. Equally, for a blade 1101*b* having a reflection coefficient, the directly adjacent blade(s) 1101b' has/have a separate reflection coefficient. The modulation of the reflected light radiation occurs according to the successive blades 1101b, 1101b' on which the light radiation is reflected, which further facilitates the determination of the number of rotations/time unit of the rotor. For example, for a rotor comprising four blades, two opposite blades 1101b' with respect to the axis of rotation of the rotor can have a first reflection coefficient, for example by being made of a first material, and the two other opposite blades 1101b with respect to the axis of rotation of the rotor can have a second reflection coefficient, for example by being made of a second material, the first and the second material having separate reflection coefficients.

According to an example, the rotor 1101 comprises at least two blades 1101b' made 20) of plastic and at least two blades 1101b made of metal, magnetic or not, and preferably made of stainless steel. Thus, the light radius has a maximum reflection on the metal blades, and a lesser reflection on the plastic blades. The reflected light radiation is therefore modulated according to the blades on which it is reflected, which facilitates the determination of the number of rotations/time unit of the rotor.

Embodiment examples of the measuring device 111 are now detailed. According to an example, the emission module 1110, the optical module 1111 and the reception module 1112 can be configured to detect, by proximity, the rotation of the rotor 1101. In the detection by proximity, the emission module 1110 and the reception module 1112 are adjacent. The light radiation is reflected by a reflector. When the blades 1101b, 1101b' of the rotor 1101 cut the bundle, the radiation reflected on the blades 1101b, 1101b' enables to detect the rotation speed of the blades 1101b, 1001b'. For this, the optical fibre 1111a can be a nearby optical fibre.

According to an example, the emission module 1110 comprises a laser source. According to this example, the conversion module 1113 comprises a laser interferometer. The laser source emits a temporally consistent radiation enabling the detection of the rotation of the rotor 1101 by interferometry. In a known manner in the field, interferometry is a measure using the phenomenon of interference of waves. The resulting interference fringes give information on the length of the optical path travelled. This technique has the advantage of being accurate while limiting the cost of the measuring subsystem 11.

According to an alternative example, the optical fibre 1111a can comprise a Bragg network. Thus, the measuring device 111 enables not only a measurement of the flow rate of the heat-transfer fluid, but further a measurement of its temperature and/or its pressure. Thus, the thermal power of the reactor 0 can be obtained 37 from the light radiation, without requiring any additional measurement. The system enables to obtain the thermal power of the reactor 0 by minimising its bulk at the assembly 1. Indeed, it is not necessary to add additional pressure and temperature sensors.

Figure 7:
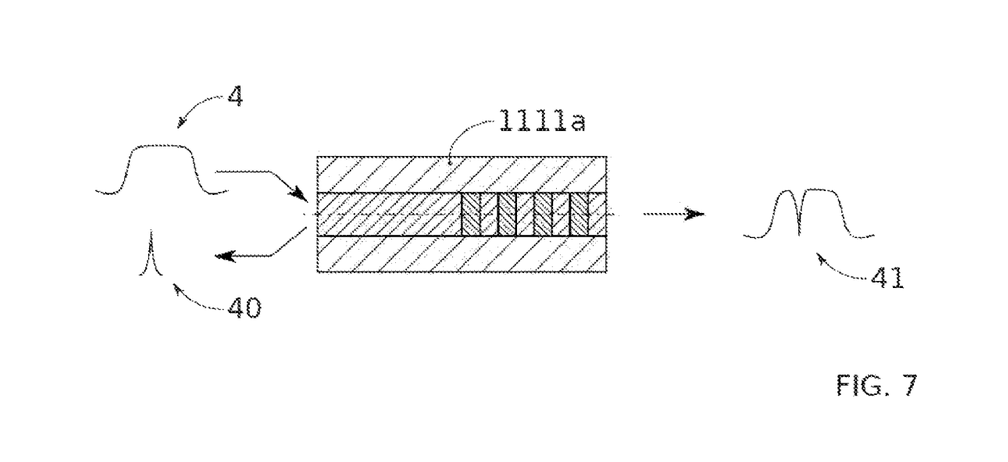
FIG. 7 represents the principle of operating an optical fibre comprising a Bragg network.

The operation of a Bragg network optical fibre is described as an example by FIG. 7. The reflected radiation 4 coming from the blades 1101b of the rotor 1101 can penetrate into the optical fibre 1111a through the transmission portion 1111c. According to the parameters of the Bragg network in the optical fibre 1111a, at least one wavelength, called Bragg wavelength 40, is reflected by the network and emerges from the fibre through the transmission portion 1111c. The light signal at the outlet of the Bragg network 41 is therefore constituted of the reflected radiation 4 at which the at least one Bragg wavelength 40 has been subtracted.

The temperature and the pressure of the fluid can make the parameters 20) of the Bragg network vary, for example by dilatation or deformation, and therefore the light signal 41 obtained. The dilatation or deformation of the Bragg network extends, in this case, from the effect of the temperature and of the pressure of the fluid on the Bragg network, and not from a mechanical deformation induced by the rotation of the rotor. It is in particular the case when the optical module 1111 is configured to be separated from the rotor 1101 at least by the fluid. As illustrated as a dotted line in FIG. 3, the conversion module 1113 can comprise a means for converting the flow rate 1113a as well as the conversion means of the temperature 1113b and of the pressure 1113c. As illustrated in FIG. 4B, the method for measuring the flow rate of the fluid can further comprise a conversion of the reflected radiation into temperature 36' and/or into pressure 36" of the fluid.

With an optical fibre comprising a Bragg network, the spectral width of the light radiation can be substantially of between a few nm and several thousand nm.

As illustrated in FIG. 5B, it is noted that it can be provided that the measuring device 111 comprise pressure 1115 and/or temperature 1114 sensors, for example additional to the optical module 1111. These sensors can be configured to measure the pressure and/or the temperature of the fluid flowing in the actuating module 110. For example, these sensors can be disposed with the optical fibre 1111a in the sleeve 1111b. Alternatively or complementarily, it can be provided that the temperature and/or the pressure of the heat-transfer fluid is/are measured by separate sensors of the measuring subsystem 11, for example disposed on neutron poles.

The method for measuring the flow rate of the fluid can further comprise a calibration of the system for determining the power generated prior to its use. For example, this calibration can be done specifically under the conditions of use of the measuring system 11 in the reactor 0.

In view of the description above, it clearly seems that the invention proposes a system for determining the power generated by an assembly, an improved accuracy with respect to the current solutions, and in particular with an accuracy within a range of +1% with respect to the actual value.

The invention is not limited to the embodiments described above, and extends to all the embodiments covered by the claims.

LIST OF NUMERICAL REFERENCES

0 Nuclear reactor
1 Core of the reactor
1a Lower end
1b Upper end
10 Assembly
11, 11a, 11b Subsystem for measuring the flow rate
110, 110a, 110b Actuating module
1100 Body
1100a Inlet
1100b Outlet
1100c Passage
1100d Outer wall
1100e Inner wall
1101 Rotor
1101a Hub
1101b Blade
1101ba Distal end
1101b' Blade 1101c Shaft
1102 Support
111 Measuring device
1110 Emission module
1111 Optical module
1111a Optical fibre
1111b Sleeve
1111c Transmission portion
1112 Reception module
1113 Conversion module
1113a Submodule for converting the flow rate
1113b Submodule for converting the temperature
1113c Submodule for converting the pressure
1114 Temperature sensor
1115 Pressure sensor
112 Connection module
1120 Sealed junction
1120a First part
1120b Second part
2 Tank of the reactor
20 Cold branch
21 Hot branch
22 Cover
220 Access conduit
3 Measuring method
30 Emission of an incident light radiation λ>1200 nm
31 Transmission of the incident light radiation
32 Reflection of the light radiation
33 Reception of the reflected light radiation
34 Conversion into fluid flow rate
35 Transmission of the reflected light radiation
36 Measurement of the pressure and of the temperature
36' Conversion into temperature
36" Conversion into pressure
37 Conversion into supplier thermal power
4 Reflected radiation
40 Bragg radiation
41 Light signal at the outlet of the Bragg network

The invention claimed is:

1. A system for determining a power generated by an assembly for a nuclear reactor, intended to be immersed in a heat-transfer fluid, comprising:
   a subsystem for measuring a flow rate of the heat-transfer fluid, including
      a body comprising at least one inlet, at least one outlet, and at least one passage for a flow of the heat-transfer fluid from the at least one inlet to the at least one outlet, the at least one passage extending from the at least one inlet to the at least one outlet in a longitudinal direction,
      at least one rotor disposed inside the at least one passage and configured to be rotated, by the flow of the heat-transfer fluid, about an axis substantially parallel to a flow direction of the heat-transfer fluid in the at least one passage, the flow direction of the heat-transfer fluid in the at least one passage being parallel to the longitudinal direction of the at least one passage, and
      a device for measuring a rotation speed of the at least one rotor, wherein the device for measuring the rotation speed of the at least one rotor comprises
         an emission module for emitting an incident light radiation having a wavelength greater than 1200 nm,
         an optical module configured to
            transmit the incident light radiation from the emission module on blades of the at least one rotor, such that the incident light radiation is incident on the blades of the at least one rotor in a direction substantially perpendicular to the axis of a rotation of the at least one rotor, and
            receive a reflected light radiation, the reflected light radiation coming from a reflection, on the blades of the at least one rotor, of the incident light radiation, and
         a first conversion module configured to determine the rotation speed of the at least one rotor according to the reflected light radiation and determine the flow rate of the heat-transfer fluid according to the rotation speed of the at least one rotor, and
   the system further comprises
      a subsystem for measuring a temperature of the heat-transfer fluid at the at least one inlet of the assembly and a temperature of the heat-transfer fluid at the at least one outlet of the assembly, and
      a second conversion module configured to determine a power generated by the assembly according to at least the flow rate of the heat-transfer fluid determined by the first conversion module and a difference between the temperature of the heat-transfer fluid at the at least one inlet of the assembly and the temperature of the heat-transfer fluid at the at least one outlet of the assembly.

2. The system according to claim 1, wherein the measuring device comprises a module for connecting the optical module to the body, configured to establish a junction sealed to the heat-transfer fluid between the optical module and the at least one passage, and transparent to the incident and reflected light radiations.

3. The system according to claim 1, wherein the optical module comprises a transmission portion of the incident light radiation which is disposed, in the direction substantially perpendicular to the axis of rotation of the at least one rotor, at a distance of less than 1 cm of an outer diameter of the at least one rotor.

4. The system according to claim 3, wherein the transmission portion of the incident light radiation is disposed, in the direction substantially perpendicular to the axis of rotation of the at least one rotor, at a distance of less than 5 mm of the outer diameter of the at least one rotor.

5. The system according to claim 1, wherein the optical module comprises an optical fiber.

6. The system according to claim 1, wherein the optical module is configured to transmit the reflected light radiation to the first conversion module.

7. The system according to claim 1, wherein the at least one rotor comprises a plurality of blades, at least one blade of the plurality of blades having a light radiation reflection coefficient different from a light radiation reflection coefficient of at least one other blade of the plurality of blades.

8. The system according to claim 1, wherein the optical module comprises an optical fiber comprising a Bragg network.

9. The system according to claim 1, wherein
   the emission module comprises a laser source, and
   the first conversion module comprises a laser interferometer.

10. The system according to claim 1, further comprising at least one pressure sensor configured to measure a parameter relating to a pressure of the heat-transfer fluid flowing in the body.

11. The system according to claim 10, wherein the at least one pressure sensor is carried by the subsystem for measuring the flow rate of the heat-transfer fluid.

12. A nuclear reactor, comprising:
a tank wherein a heat-transfer fluid circulates, and
a set of assemblies disposed in the tank,
and the system according to claim 1 disposed in the tank.

13. The reactor according to claim 12, wherein at least some of the assemblies are adjacent to said system.

14. The reactor according to claim 12, wherein the reactor is a light water reactor.

15. A method for determining a power generated by an assembly for a nuclear reactor, using a system comprising:
a subsystem for measuring a flow rate of the heat-transfer fluid, including
a body comprising at least one inlet, at least one outlet, and at least one passage for a flow of the heat-transfer fluid from the at least one inlet to the at least one outlet, the at least one passage extending from the at least one inlet to the at least one outlet in a longitudinal direction,
at least one rotor disposed inside the at least one passage and configured to be rotated, by the flow of the heat-transfer fluid, about an axis substantially parallel to a flow direction of the heat-transfer fluid in the at least one passage, the flow direction of the heat-transfer fluid in the at least one passage being parallel to the longitudinal direction of the at least one passage, and
a device for measuring a rotation speed of the at least one rotor, wherein the device for measuring the rotation speed of the at least one rotor comprises
an emission module for emitting an incident light radiation having a wavelength greater than 1200 nm,
an optical module configured to
transmit the incident light radiation from the emission module on blades of the at least one rotor, such that the incident light radiation is incident on the blades of the at least one rotor in a direction substantially perpendicular to the axis of a rotation of the at least one rotor, and
receive a reflected light radiation, the reflected light radiation coming from a reflection, on the blades of the at least one rotor, of the incident light radiation, and
a first conversion module configured to determine the rotation speed of the at least one rotor according to the reflected light radiation and determine the flow rate of the heat-transfer fluid according to the rotation speed of the at least one rotor, and
the system further comprises
a subsystem for measuring a temperature of the heat-transfer fluid at the at least one inlet of the assembly and a temperature of the heat-transfer fluid at the at least one outlet of the assembly, and
a second conversion module configured to determine a power generated by the assembly according to at least the flow rate of the heat-transfer fluid determined by the first conversion module and a difference between the temperature of the heat-transfer fluid at the at least one inlet of the assembly and the temperature of the heat-transfer fluid at the at least one outlet of the assembly,
the method comprising:
measuring the flow rate of the heat-transfer fluid comprising at least
emitting, by the emission module, the incident light radiation having the wavelength greater than 1200 nm,
transmitting, by the optical module, the incident light radiation from the emission module on the blades of the at least one rotor, such that the incident light radiation is incident on the blades of the at least one rotor in the direction substantially perpendicular to the axis of rotation of the at least one rotor,
reflecting the incident light radiation on the blades of the at least one rotor,
receiving, by the optical module, the reflected light radiation,
converting, by the first conversion module, the reflected light radiation to determine the rotation speed of the at least one rotor, and
determining the flow rate of the heat-transfer fluid according to the rotation speed of the at least one rotor,
measuring the temperature of the heat-transfer fluid at the at least one inlet of the assembly and the temperature of the heat-transfer fluid at the at least one outlet of the assembly, and
converting into power generated by the assembly from at least the flow rate of the heat-transfer fluid, and the difference between the temperature of the heat-transfer fluid at the at least one inlet of the assembly and the temperature of the heat-transfer fluid at the at least one outlet of the assembly.

16. The method according to claim 15, further comprising measuring a pressure of the heat-transfer fluid.

17. The method according to claim 15, wherein the measuring of one from among the temperature of the heat-transfer fluid at the at least one inlet of the assembly and the temperature of the heat-transfer fluid at the at least one outlet of the assembly is obtained from the reflected light radiation.

18. The method according to claim 15, wherein
the nuclear reactor comprises a tank wherein the heat-transfer fluid circulates, and
the heat-transfer fluid circulating in the tank is at a pressure of less than 200 bar, at a temperature of less than 350° C. and flows at a flow rate of between 0.05 and 25000 $m^3/h$.

* * * * *